United States Patent
Noji (10) Patent No.: US 8,049,782 B2
(45) Date of Patent: Nov. 1, 2011

(54) IMAGE BLUR CORRECTION DEVICE AND IMAGING DEVICE FURNISHED THEREWITH

(75) Inventor: Takayoshi Noji, Saitama (JP)

(73) Assignee: Tamron Co., Ltd., Saitama (JP)

( * ) Notice: Subject to any disclaimer, the term of this patent is extended or adjusted under 35 U.S.C. 154(b) by 378 days.

(21) Appl. No.: 12/320,244

(22) Filed: Jan. 22, 2009

(65) Prior Publication Data

US 2009/0128637 A1    May 21, 2009

Related U.S. Application Data

(63) Continuation of application No. PCT/JP2006/314638, filed on Jul. 25, 2006.

(51) Int. Cl.
  *H04N 5/228* (2006.01)
  *G03B 17/00* (2006.01)
(52) U.S. Cl. ............... 348/208.2; 348/208.11; 396/55
(58) Field of Classification Search ............... 348/308.2, 348/208.4, 208.7, 208.11
  See application file for complete search history.

(56) References Cited

U.S. PATENT DOCUMENTS

| | | | |
|---|---|---|---|
| 7,436,435 B2 | 10/2008 | Wada | |
| 7,639,933 B2 * | 12/2009 | Seo et al. | 396/55 |
| 7,778,535 B2 * | 8/2010 | Kobayashi | 396/55 |
| 2005/0270379 A1 | 12/2005 | Seo | |
| 2006/0072913 A1 | 4/2006 | Noji | |

FOREIGN PATENT DOCUMENTS

| | | |
|---|---|---|
| JP | 06-46322 A | 2/1994 |
| JP | 2000-307937 A | 11/2000 |
| JP | 2003-110919 A | 4/2003 |
| JP | 2004-77686 A | 3/2004 |
| JP | 2004-077711 | 3/2004 |
| JP | 2005-351917 A | 12/2005 |
| JP | 2006-106177 A | 4/2006 |

* cited by examiner

*Primary Examiner* — Ngoc-Yen Vu
(74) *Attorney, Agent, or Firm* — Jacobson Holman PLLC (57) ABSTRACT

Provides an image blur correction device capable of accurately moving an imaging element, and an imaging device equipped therewith. The image blur correction device of the present invention includes a fixed plate (12); a moving base (14) to which an imaging element (16) is attached; support means (18) supporting a movable member; at least three drive coils (20) disposed on the movable member; a position sensor (24) disposed on the fixed member; at least three drive magnets (22) respectively attached to the fixed member in positions opposing each of the drive coils; detection means (34) for detecting blurring of an optical axis; and control means (36) for sourcing current to each of the drive coils so as to drive the movable member based on the blur of the optical axis and the position of the movable member, thereby controlling blurring of the image formed on the imaging device.

11 Claims, 9 Drawing Sheets

IMAGE BLUR CORRECTION DEVICE AND IMAGING DEVICE FURNISHED THEREWITH

CROSS-REFERENCE TO RELATED APPLICATIONS

This is a continuation of PCT/JP06/314638 filed Jul. 25, 2006 and published in Japanese, hereby incorporated by reference.

BACKGROUND OF THE INVENTION

1. Field of the Invention

The present invention relates to an image blur correction device and imaging device furnished therewith, and in particular to an image blur correction device and imaging device furnished therewith for suppressing the blurring of images formed on imaging elements by driving said imaging elements.

2. Description of Related Art Including Information Disclosed Under 37 CFR §§1.97 and 1.98

Proposals have been made for cameras provided with an image blur correction device, whereby blurring of an image formed on an imaging element is suppressed by deflecting imaging elements such as CCDs or the like. Published Unexamined Application 2000-307937 (Patent Document 1) describes an imaging device furnished with a hand-induced blur prevention mechanism of this type. In that imaging device, an imaging element is attached to an L-shaped member via a first actuator, and the imaging element is driven by attaching this L-shaped member to the imaging device main body via a second actuator. The first actuator, that is, drives the imaging element in a first direction relative to the L-shaped member, and the second actuator drives the L-shaped member in a second direction relative to the imaging device main body. The imaging elements are moved in parallel to a desired position by the combination these first and second deflections.

Published Unexamined Application H6-46322 (Patent Document 2) describes an imaging device with a vibration damping function. In this imaging device, the imaging elements are slidably supported with respect to two perpendicular bars, and are driven in each direction by the repulsion between electromagnets and permanent magnets attached to each bar.

Published Unexamined Application 2003-110919 (Patent Document 3) describes an imaging device. In this imaging device, the imaging element is moved by a drive device having a base plate, a first slider moving in a direction parallel to the base plate, and a second slider moving in a direction perpendicular to the direction of movement of the first slider. Each slider is driven in each direction by an actuator using a piezoelectric element.

Published Unexamined Application 2004-77686 (Patent Document 4) describes an image stabilizing camera. In this image stabilizing camera, CCD imaging elements are supported by a first set of leaf springs constituted to be elastically deformable in a first direction, and another set of leaf springs constituted to be elastically deformable in a second direction perpendicular to the first direction. The CCD imaging elements are deflected by pressing in each direction using actuators furnished with piezoelectric elements.

Published Unexamined Application 2004-77711 (Patent Document 5) describes a camera with a hand vibration correction function. In this camera, the imaging elements are supported so as to be rotatable about two mutually perpendicular axial lines parallel to the light receiving surfaces of the imaging elements. Image blurring is corrected by rotating the imaging elements about these two axial lines using piezoelectric elements.

Patent Document 1: Published Unexamined Application 2000-307937
Patent Document 2: Published Unexamined Application H6-46322
Patent Document 3: Published Unexamined Application 2003-110919
Patent Document 4: Published Unexamined Application 2004-77686
Patent Document 5: Published Unexamined Application 2004-77711

BRIEF SUMMARY OF THE INVENTION

Problems to Be Solved by the Invention

In each of the image blur correction devices set forth in Patent Documents 1 through 5 above, the imaging elements are respectively slidably supported along two perpendicular axial lines. The imaging elements are moved in parallel to a desired position by combining the deflections along these two axial lines. To slidably support the imaging elements along a given axial line, however, requires the provision of a clearance to permit that sliding; when the imaging elements are supported so as to be respectively slidable along two axial lines, these clearances are added. This leads to the problem of increased cumulative play in the mechanism supporting the imaging elements, thereby reducing imaging element positioning accuracy. Conversely, if play is inhibited by applying a weight to the mechanism supporting the imaging element, sliding resistance in the support mechanism increases, thereby increasing the electrical power needed to drive the imaging elements.

Therefore the present invention has the object of providing an image blur correction device and imaging device furnished therewith wherein the imaging elements can be accurately moved. The present invention also has the object of providing an image blur correction device and imaging device furnished therewith wherein the imaging elements can be moved with a small force.

Means for Solving the Problems

In order to solve the above-described problems, the image blur correction device according to the present invention comprises a fixed member; a movable member to which an imaging element is affixed; support means supporting the movable member relative to the fixed member such that the movable member can move translationally and rotationally within a plane parallel to the light receiving surface of the imaging element; at least three drive coils disposed on either the fixed member or the movable member; at least three position sensors disposed on the member among the fixed member and the movable member to which the drive coils are attached; at least three drive magnets respectively attached to the other of the fixed member or movable member at positions opposing each of the drive coils, so as to receive a drive force from the magnetic field generated by each of the drive coils; detection means for detecting blurring of an optical axis of light incident on the light receiving surface of the imaging element; and a control means for controlling the blurring of an image formed on the imaging element by sourcing current to each drive coil to move the movable member such that it is moved translationally, without rotational movement, in the X and Y directions, based on the optical axis blurring detected by the detection means, and based on the detected position of the movable member relative to the fixed member as detected by the position sensor.

In the present invention thus constituted, blurring of the optical axis of light incident on the imaging element light receiving surface is detected by a blur detection means. Also, a position sensor detects the position of a movable member relative to a fixed member. The blur detection means sources a current to each drive coil based on blurring of the optical axis detected by the blur detection means and on the position of the movable member detected by the position sensor. A magnetic field is produced when a current flows in the drive coils; this magnetic field imparts drive force to the drive magnets. The movable members supported by the support means are driven by this drive force, and blurring of the image formed on these imaging elements is suppressed by movement of the imaging element attached to the movable members.

In the present invention thus constituted, movable members to which imaging elements are attached are supported by support means for supporting the movable members such that they can be moved in a desired direction within a plane parallel to the light receiving surface of the imaging elements, therefore the imaging elements can be accurately moved without the accumulation of play in the support means which occurs when movable members are slidably supported by the combination of sliding motions along two perpendicular axes.

The present invention preferably further comprises a pull-in yoke for pulling in the movable member and the fixed member attached to whichever of the above fixed member and movable member to which the drive magnet is not attached, wherein the support means comprises at least three spherical bodies sandwiched between the fixed member and the movable member.

In the present invention thus constituted, a movable member is pulled inward, parallel to a fixed member, by the magnetic force imparted by the drive magnet and the pull-in yoke. At least three spherical bodies are sandwiched between the movable member and the fixed member, and the movable member is supported in parallel with respect to the fixed member. The movable member can be moved in a desired direction by rolling the spherical bodies on the fixed member.

Because in the present invention thus constituted the movable member is moved by rolling the spherical bodies, there is virtually no sliding resistance accompanying the movement of the movable member, and the movable member can be moved with a small force. Also, because movement of the movable member in a desired direction is allowed by the rolling of the spherical bodies in a desired direction, play does not accumulate to a large degree as in support means structured to combine movement in two perpendicular directions.

In the present invention, wherein at least one of the drive magnets is preferably disposed to receive a drive force in a direction of a first axis by a magnetic field generated by the drive coil opposed thereto, and the other drive magnet is disposed to receive a drive force in a direction different from the first axis, by magnetic fields generated by each of the drive coils opposed thereto.

In the present invention thus constituted, the movable members are driven in a desired direction by receiving a drive force in a direction of a first axis, and a drive force in a direction different therefrom.

In the present invention, three drive coils are preferably disposed on an approximately straight line, and two of the drive magnets opposed thereto are disposed to receive a drive force in a direction of a first axis by a magnetic field generated by the drive coils, while the other drive magnet is disposed to receive a drive force in a direction of a second axis approximately perpendicular to the first axis by a magnetic field generated by the drive coil opposed thereto.

In the present invention thus constituted, the movable member is driven in a desired direction by receiving a first direction drive force and a second direction drive force approximately perpendicular thereto.

In the present invention thus constituted, the drive force parallel to the first axis and the drive force parallel to the second axis can be independently determined, thus simplifying computation in a control means.

The control means in the present invention preferably corrects the current sourced to each of the drive coils based on information about the imaging lens focal length for forming an image on the imaging element, or based on an initial imaging device offset value.

In the present invention thus constituted, image blurring can be effectively suppressed even when there are changes in parameters, such as the focal length of the imaging lens used to form an image on the imaging element due to a zoom mechanism or the like.

The image blur correction device of the present invention comprises a movable member having an imaging element mounted on one side thereof, and at least three drive magnets arrayed in a row and mounted on the other side thereof; a fixed member having at least three drive coils respectively mounted at positions corresponding to the drive magnets on one of the sides opposing the other side of the movable member, and position detection means disposed within said drive coils; a sliding means interposed between the movable member and the fixed member, capable of sliding when the movable member moves; an angular velocity detection means for obtaining a vehicle detection value by detecting the angular velocity component of the inclination of an optical axis due to blur; actuators having the drive coils, the position detection means, and the drive magnets, at least three said actuators being arrayed in a row, obtaining a specified position signal in response to the strength of the magnetic field from said position detection means, and being supplied with a specified drive correction signal, said actuator causing movement to a specified corrected position to correct for blurring of the movable member, using at least the propulsion created by the interaction of the drive coils and the drive magnets; a control means for obtaining a corrected position command signal based on the angular velocity detection value and the specified correction signal, and for supplying drive correction signals for correcting blur to the actuator from said position command signals and from the position signals; and whereby using the control means, the actuator is capable of moving the movable member in the two directions X and Y.

In the present invention, there are preferably three drive magnets, and the two drive magnets found at each end are preferably disposed to receive a vertical direction drive force, while the center drive magnet is disposed to receive a horizontal drive force.

The imaging device of the present invention also has the image blur correction device of the present invention, and a lens unit comprising an imaging lens for forming an image on the imaging element, attached to the movable member of said image blur correction device.

Effect of the Invention

The image blur correction device and imaging device furnished therewith of the present invention enables imaging elements to be moved with high accuracy.

Also, the image blur correction device and imaging device furnished therewith of the present invention enables imaging elements can be moved with a small force.

BRIEF DESCRIPTION OF THE SEVERAL VIEWS OF THE DRAWINGS

FIG. 7 An (a) perspective view and (b) side elevation explaining the relationship between movement of a drive magnet and the signal output from a Hall element.

DETAILED DESCRIPTION OF THE INVENTION

Next we discuss embodiments of the present invention, with reference to the attached drawings.

Figure 1:
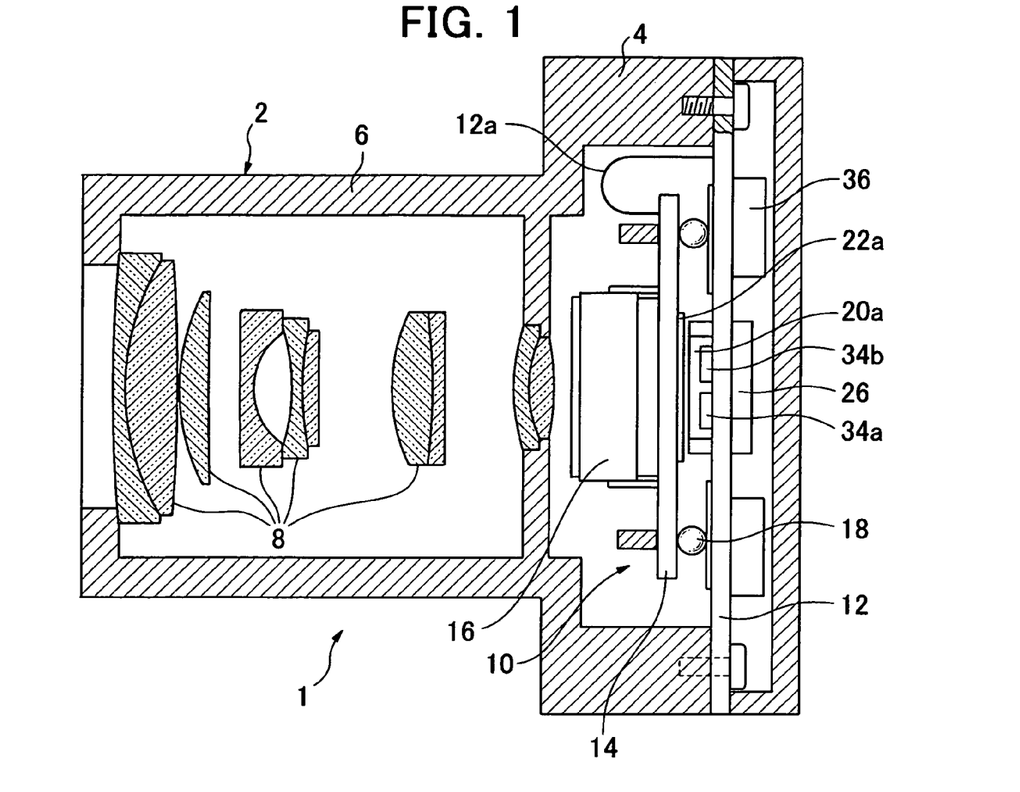
FIG. 1 A cross section of an imaging device according to an embodiment of the present invention.

Referring to FIGS. 1 through 11, we discuss an imaging device according to an embodiment of the present invention. FIG. 1 is a cross section of an imaging device according to an embodiment of the present invention.

As shown in FIG. 1, the imaging device 1 embodiment of the present invention has a lens unit 2 and a camera main body 4. The lens unit 2 has a lens barrel 6 and a plurality of imaging lenses 8 disposed within this lens barrel. The camera main body 4 has an actuator 10 for moving a CCD 16 (charge-coupled device) serving as imaging element within a specified plane, and gyros 34a and 34b, which are blur detection means for detecting blurring in the camera main body 4. Of these, at least the CCD 16, the actuator 10, and the gyros 34a and 34b function as an image blur correction device.

In the imaging device 1 embodiment of the present invention, blurring is detected by the gyros 34a and 34b; the actuator 10 is activated based on the detected blurring, the CCD 16 is moved, and blurring of the image formed on the light receiving plane of the 16 is corrected. In the present embodiment, piezoelectric oscillating gyros are used as the gyros 34a and 34b serving as detection means for detecting angular velocity, but any desired sensor such as an accelerometer, a laser gyro, or a mechanical gyro may be used as the detection means.

Focus adjustment and focal length can be changed by moving the plurality of internal imaging lenses 8. The lens unit 2 is attached to the camera main body 4, and is constituted to form incident light into an image on the light receiving surface of the CCD 16.

Figure 2:
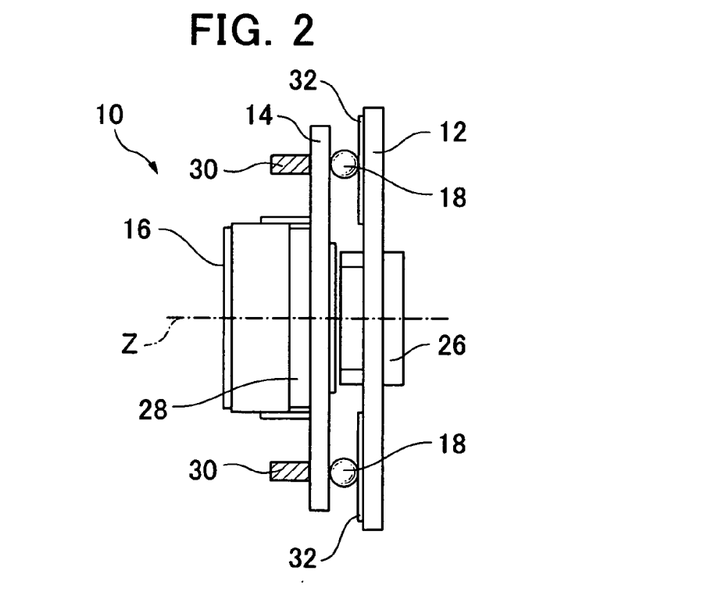
FIG. 2 A side elevation of an actuator used in an embodiment of the present invention.
Figure 3:
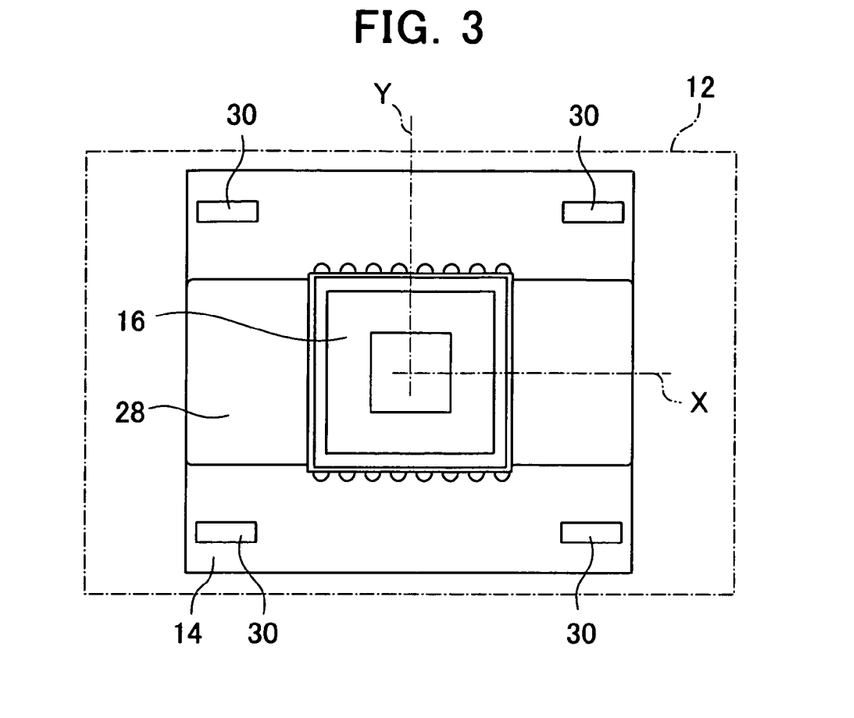
FIG. 3 A front elevation of an actuator moving base.
Figure 4:
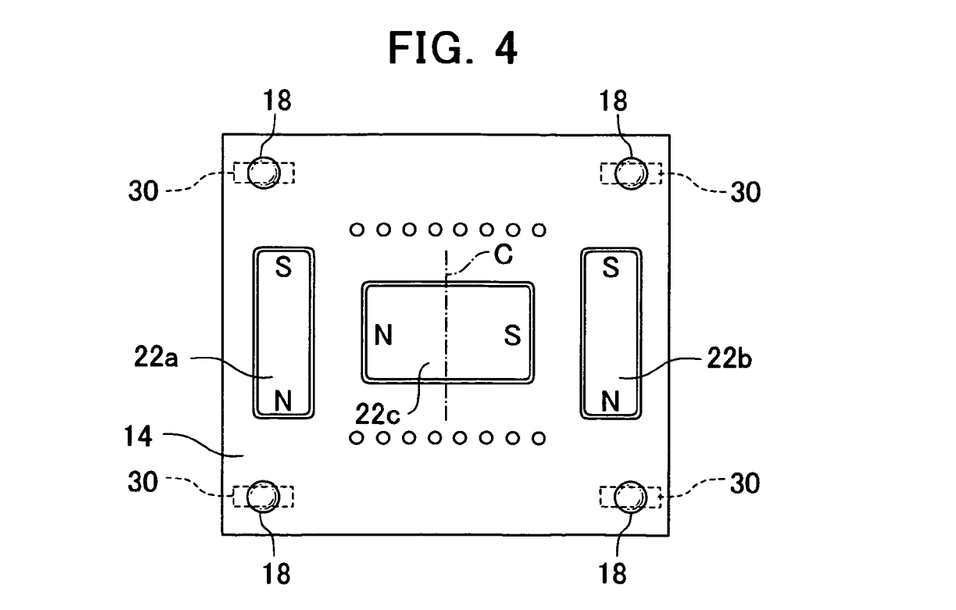
FIG. 4 A rear elevation of an actuator moving base.
Figure 5:
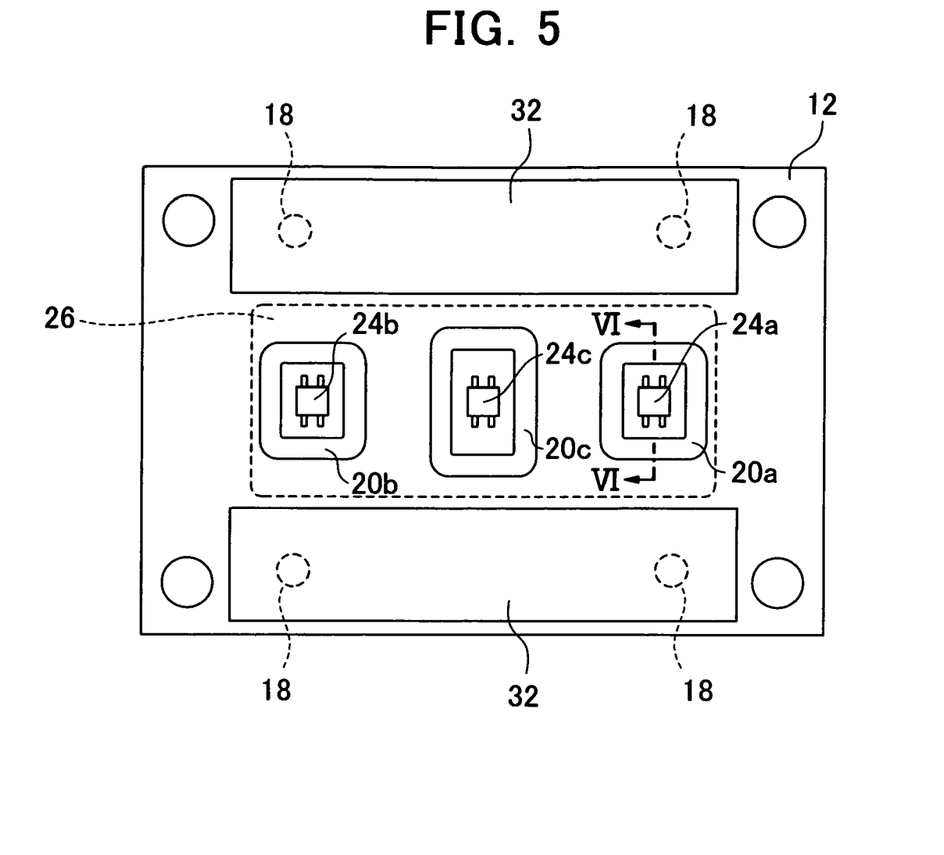
FIG. 5 A front elevation of a fixed plate supporting a moving base.

Next we discuss the actuator 10, referring to FIGS. 2 through 5. FIG. 2 is a side view of the actuator 10. FIG. 3 is a front view of a moving base 14 to which the CCD 16 is attached; FIG. 4 is a rear view thereof. FIG. 5 is a front view of the fixed plate 12 supporting the moving base 14. As shown in FIGS. 2 through 5, the actuator 10 has the fixed plate 12 serving as a fixed member affixed inside the camera main body 4, the moving base 14 serving as a movable member supported so as to be movable relative to the fixed plate 12, and four spherical body steel balls 18 serving as a support means to support the moving base 14. Furthermore, the actuator 10 has three drive coils 20a, 20b, and 20c, attached to the fixed plate 12, three drive magnets 22a, 22b, and 22c, attached at positions respectively corresponding to the drive coils 20a, 20b, and 20c on the moving base 14, and Hall elements 24a, 24b, and 24c, which are position sensors serving as position detection means, disposed inside of each of the drive coils 20a, 20b, and 20c. The actuator 10 has a pull-in yoke 26 attached to the fixed plate 12 to cause the moving base 14 to be pulled in to the fixed plate 12 by the magnetic field of each of the drive magnets, and a back yoke 28 attached to the back side of each drive magnet to effectively direct the magnetic field of each drive magnet toward the fixed plate 12. Furthermore, the actuator 10 has a pull-in magnet 30 for pulling in the steel balls 18 to the moving base 14, and a steel ball holder 32 attached to the fixed plate 12, so that the steel balls 18 roll smoothly between the fixed plate 12 and the moving base 14.

Note that the support means can also be a sliding means with a structure enabling the fixed plate 12 and the moving base 14 to slide smoothly on a smooth surface.

Furthermore, as shown in FIG. 1, the actuator 10 has a controller 36 serving as a control means for controlling current sourced to the drive coils 20a, 20b, and 20c based on blurring detected by the gyros 34a and 34b, and on information about the position of the moving base 14 detected by the Hall elements 24a, 24b, and 24c. Also, a flexible cable 12a is connected between the moving base 14 and the fixed plate 12 for transmitting signals and the like from the CCD 16 to the fixed plate 12 side.

The actuator 10 moves the moving base 14 relative to the fixed plate 12 affixed on the camera main body 4, within a plane parallel to the light receiving surface of the CCD 16, so there is no distortion of the image formed on the light receiving surface even if the camera main body 4 vibrates.

As shown in FIG. 5, the fixed plate 12 has an approximately rectangular shape, and the three drive coils 20a, 20b, and 20c on the front surface side thereof are disposed in an approximately straight line in the horizontal direction. In the present embodiment, the conductors on the drive coils 20a and 20b at each end are wound in an approximately square shape, and are used for driving in a vertical direction. The conductor on the drive coil 20c disposed between these drive coils 20a and 20b is wound in an approximately rectangular shape, with the long sides thereof disposed to face the vertical direction, for driving in the horizontal direction.

The moving base 14 has an approximately rectangular shape, whereby the long sides are shorter than the fixed plate 12; it is disposed parallel to the fixed plate 12 so that the fixed plate 12 center point and the moving base 14 center point essentially overlap. The CCD 16 is attached at the center of the front side of the moving base 14. Rectangular drive magnets 22a, 22b, and 22c are respectively attached at positions corresponding to each of the drive coils 20a, 20b, and 20c on the back side of the moving base 14. The drive magnets 22a and 22b at each end are attached so that the long sides thereof face in the vertical direction, and the drive magnet 22c at the center is attached so that the long sides thereof face in the horizontal direction. The drive magnet 22c is formed so that its short sides are longer than the drive magnets 22a and 22b and it is larger than magnets 22a and 22b. Note that in this Specification the position corresponding to the drive coil means the position at which the magnetic field formed by the drive coils is substantially imparted.

Furthermore, the drive magnets 22a and 22b are magnetized so as to be polarized in the vertical direction as shown in FIG. 4, and the electrically neutral axis C thereof is oriented in the horizontal direction. Thus when a current flows in the corresponding drive coils, the drive magnets 22a and 22b receive a drive force in the vertical direction. At the same time, the drive magnet 22c is magnetized to be polarized in the horizontal direction, as shown in FIG. 4, and the electrically neutral axis C thereof is oriented in the vertical direction. Thus when a current flows in the corresponding drive coils, the center drive magnet 22c receives a drive force in the horizontal direction.

Note that in this Specification, electrically neutral axis C refers to the line connecting points at which the magnet becomes electrically neutral, i.e., where the polarity changes from S polarity to N polarity between the respective N pole and S pole ends of the long side of a drive magnet 22. Therefore in the present embodiment the electrically neutral axis C is positioned in a region which approximately divides the long side of each rectangular drive magnet into two equal parts.

A back yoke 28 for efficiently directing the magnetic flux of each drive magnet toward the fixed plate 12 is attached to the surface on the opposite side of each drive magnet, i.e. the surface on the front side of the moving base 14. This back yoke 28 is formed of a single elongated rectangular piece, the long side of which is attached facing in the horizontal direction to overlap with each of the drive magnets 22a, 22b, and 22c. The back yoke 28 is attached to the bottom side of the CCD 16, i.e., in a way which straddles the back yoke 28.

An elongated narrow single piece rectangular pull-in yoke 26 is attached on the opposite side of each drive coil on the fixed plate 12, i.e., on the back side of the fixed plate 12. The long side of the pull-in yoke 26 is attached to face in the horizontal direction at a position overlapping each of the drive magnets 22a, 22b, and 22c. The moving base 14 is pulled in to the fixed plate 12 by the magnetic field exerted by each drive magnet on the pull-in yoke 26. In the present embodiment, the fixed plate 12 is constituted of a non-magnetic material so that magnetic force lines of the drive magnet 22 efficiently reach the pull-in yoke 26.

As shown in FIG. 5, Hall elements 24a, 24b, and 24c are disposed on the inside of each of the drive coils 20a, 20b, and 20c. When the moving base 14 is in a neutral position, the sensitivity center point S of each Hall element is disposed on the electrically neutral axis C of each drive magnet. Note that in the present embodiment, the Hall element sensitivity center point S refers to the point at which the Hall element output is zero, when the drive magnet electrically neutral axis C is positioned to pass through that point.

Figure 6:
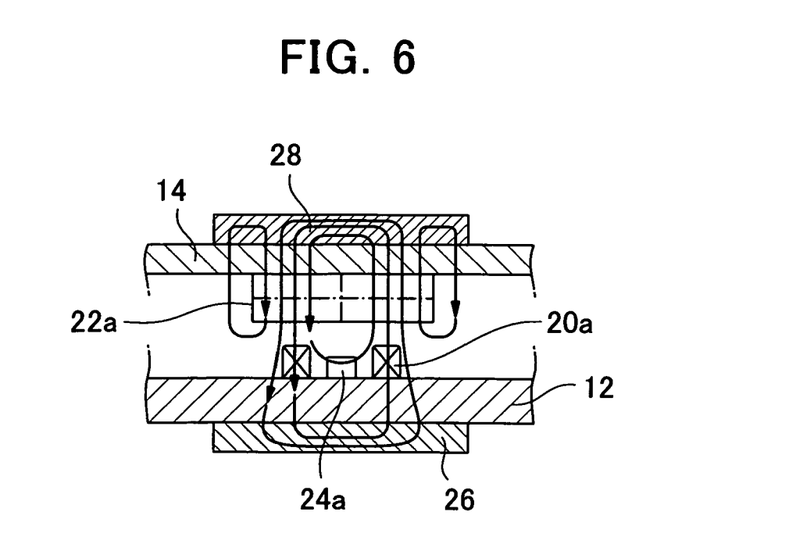
FIG. 6 A diagram showing the distribution of an electric field between a moving base and a fixed plate.

FIG. 6 depicts the magnetic field distribution between the moving base 14 and the fixed plate 12 in section VI-VI of FIG. 5. As shown in FIG. 6, the magnetic field formed, for example, by the drive magnet 22a attached to the moving base 14 reaches the pull-in yoke 26 on the rear surface side of the fixed plate 12, causing the moving base 14 to be pulled in to the fixed plate 12. The magnetic field produced by the drive magnet 22a, by virtue of the interaction with the magnetic field produced by the flow of current in the drive coils 20a, exerts a drive force in the vertical direction (the horizontal direction in FIG. 6) on the drive magnet 22a. Furthermore, the magnetic field produced by the drive magnet 22a is sensed by the Hall element 24a, and the position of the drive magnet 22a relative to the Hall element 24a is detected. The other drive magnets 22b and 22c form a similar magnetic field.

Figure 7:
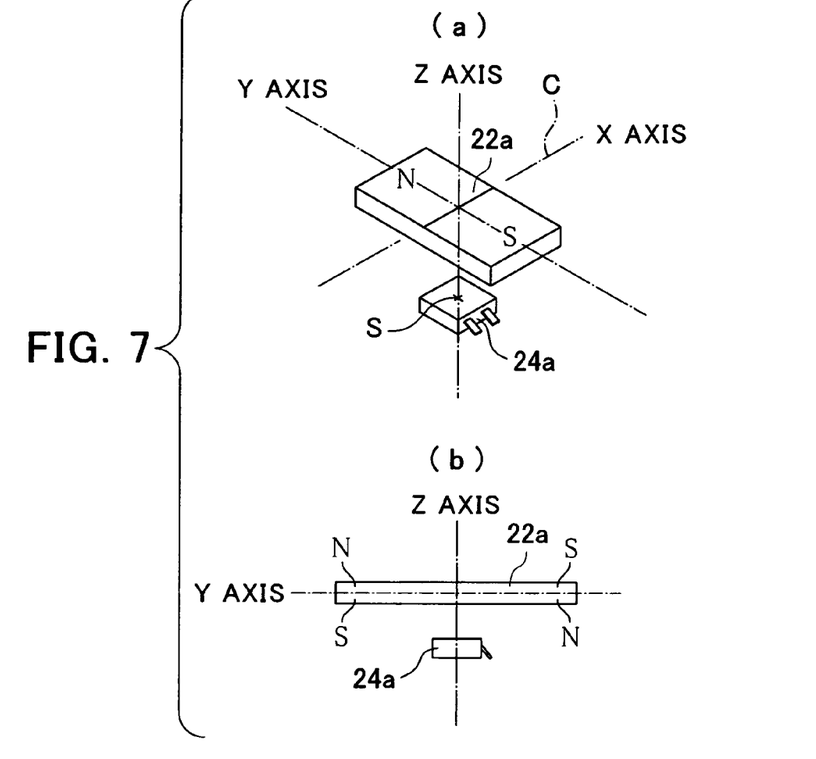
Figure 8:
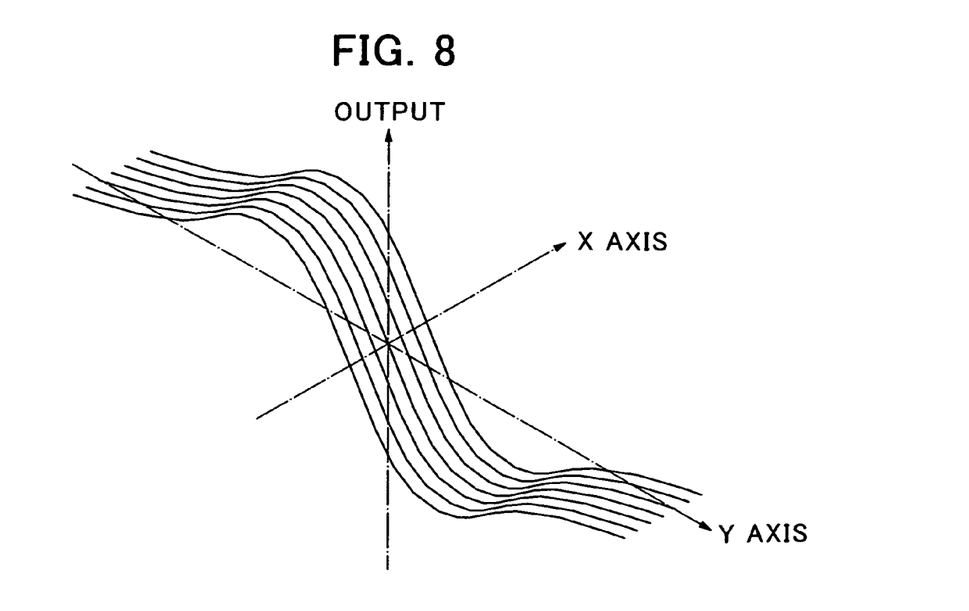
FIG. 8 A graph explaining the relationship between movement of a drive magnet and the signal output from a Hall element.
Figure 9:
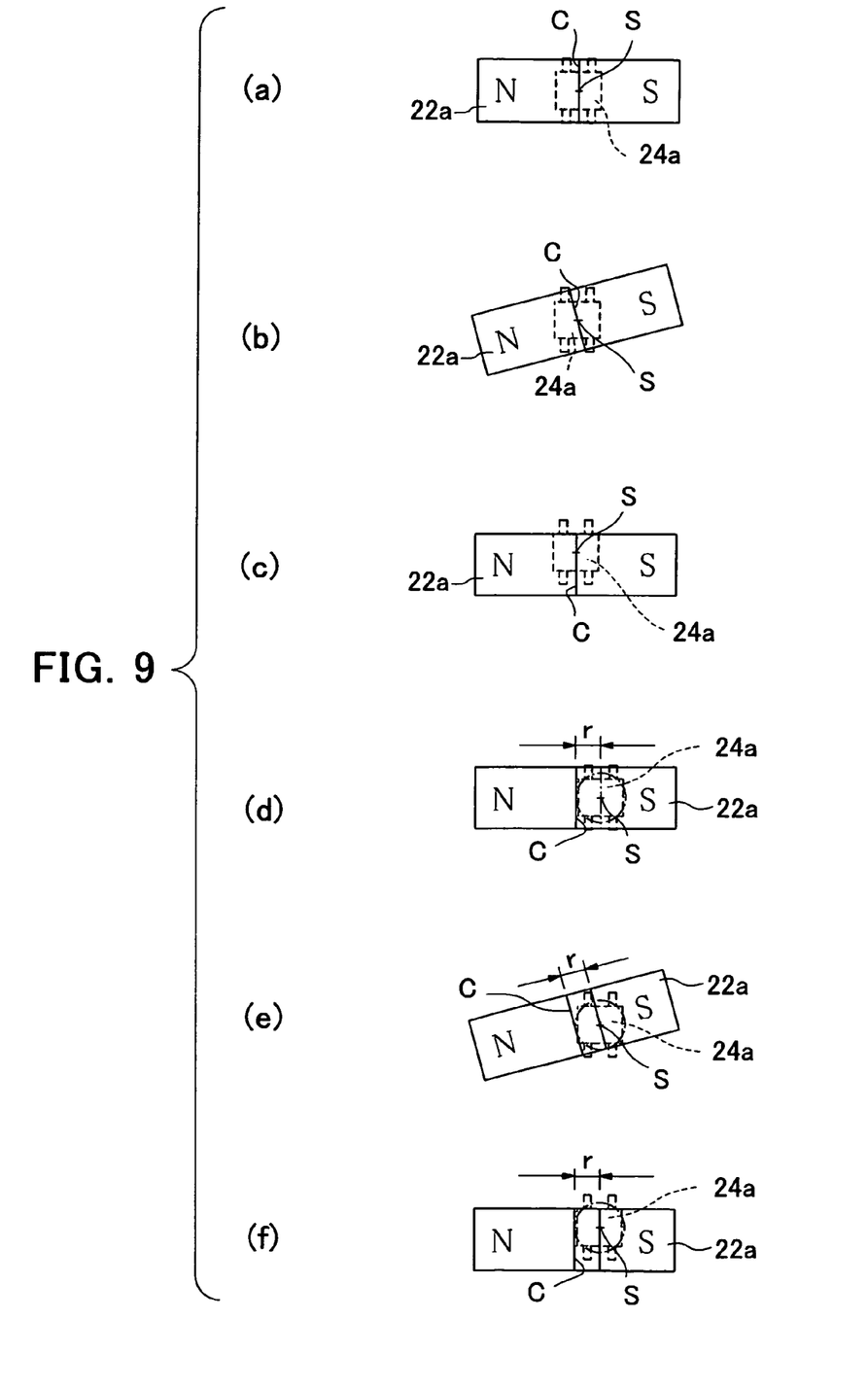
FIG. 9 A plan view explaining the relationship between movement of a drive magnet and the signal output from a Hall element.

FIGS. 7 through 9 are diagrams explaining the relationship between the movement of the drive magnet 22a and the signal output from the Hall element 24a. As shown in FIGS. 7(a) and (b), the drive magnet 22a is magnetically polarized into S and N poles in the longitudinal direction of the rectangle, and is also magnetically polarized into S and N poles in the thickness direction. As shown in FIG. 7, when the sensitivity center point S of the Hall element 24a is positioned on the electrically neutral axis C of the drive magnet 22a, the output signal from the Hall element 24a is zero. When the drive magnet 22a moves together with the moving base 14 and the sensitivity center point of the Hall element 24a separates from the electrically neutral axis of the drive magnet 22a such that image offset occurs, the output signal of the Hall element 24a changes. As shown in FIG. 8, when the drive magnet 22a moves in a direction perpendicular to the electrically neutral axis C, i.e., in the Y axis direction, the Hall element 24a generates a sinusoidal signal. Therefore when the amount of movement is very small, the Hall element 24a outputs a signal approximately proportional to the distance of movement of the drive magnet 22a. In the present embodiment, when the distance of movement of the drive magnet 22a is within about 3% of the length of the long side of the drive magnet 22a, the signal output from the Hall element 24a is approximately proportional to the distance between the Hall element 24a sensitivity center point S and the drive magnet 22a electrically neutral axis C. Also, in the present embodiment the actuator 10 operates within a range in which the output of each Hall element is approximately proportional to distance.

FIGS. 9(a) through (c) show the case in which the electrically neutral axis C of drive magnet 22a is positioned on the Hall element 24a sensitivity center point S; the output signal from the Hall element 24a is also zero when the drive magnet 22a is moved by rotation, as in FIG. 9(b), or when the drive magnet 22a moves in the direction of the electrically neutral axis C (the X axis direction), as in FIG. 9(c). FIGS. 9(d) through (f) show a case in which the electrically neutral axis C of drive magnet 22a is separated from the Hall element 24a sensitivity center point S; a signal proportional to the size of the distance r between the sensitivity center point S and the electrically neutral axis C is output from the Hall element 24a. Therefore when the distance r between the sensitivity center point S and the electrically neutral axis C is the same, the same size signal is output from the Hall element 24a, whether in the case in which the drive magnet 22a moves in a direction perpendicular to the electrically neutral axis C, as in FIG. 9(d), or the case in which the drive magnet 22a moves translationally and rotationally, as in FIG. 9(e), or the case in which it moves translationally in a desired direction, as in FIG. 9(f).

We have here discussed the Hall element 24a, but a similar signal is output from the other Hall elements 24b and 24c based on the positional relationship with the drive magnets 22b and 22c corresponding thereto. It is therefore possible, based on signals detected by each of the Hall elements 24a, 24b, and 24c, to specify the position to which the moving base 14 translationally and rotationally moves relative to the fixed plate 12.

The four previously described steel balls 18 serving as support means are respectively disposed in the four corners of the rear side of the moving base 14. As shown in FIGS. 2 through 4, each of the steel balls 18 is pulled in to the moving base 14 by the four pull-in magnets 30 attached to the front side of positions corresponding to each of the steel balls 18 on the moving base 14. Each of the steel balls 18 is pulled to the moving base 14 by the pull-in magnets 30, and the moving base 14 is pulled to the fixed plate 12 by each of the drive magnets, therefore the steel balls 18 are sandwiched between the fixed plate 12 and the moving base 14. The moving base 14 is thus supported on a plane parallel to the fixed plate 12, and each of the steel balls 18 rolls while being sandwiched, thus enabling translational movement and rotational movement of the moving base 14 relative to the fixed plate 12 in the desired direction.

Two elongated rectangular steel ball holders 32 are attached at the front side of the fixed plate 12 so as to contact the steel balls 18. When the moving base 14 moves with the steel balls 18 sandwiched between the fixed plate 12 and the moving base 14, each of the steel balls 18 rolls on the steel ball holders 32. Therefore no major sliding friction is produced between the two even when the moving base 14 moves relative to the fixed plate 12. The surfaces of the moving base 14 and the steel ball holders 32 are preferably formed to be smooth, and the moving base 14 and the steel ball holders 32 are preferably formed of a high surface hardness material so that rolling resistance is low between the steel balls 18 and the moving base 14, and between the steel balls 18 and the steel ball holders 32.

Note that in the present embodiment the moving base 14 is formed of a non-magnetic material, therefore the magnetic force lines of the pull-in magnets 30 efficiently reach the steel balls 18. In the present embodiment, steel spheres are used for the steel balls 18 serving as support bodies, but the steel balls 18 do not necessarily have to be spherical bodies. That is, an object will serve the purpose of the steel balls 18 so long as the portion thereof making contact with the steel ball holder 32 during activation of the actuator 10 is approximately spherical. In this Specification we refer to that form as a spherical body.

Figure 10:
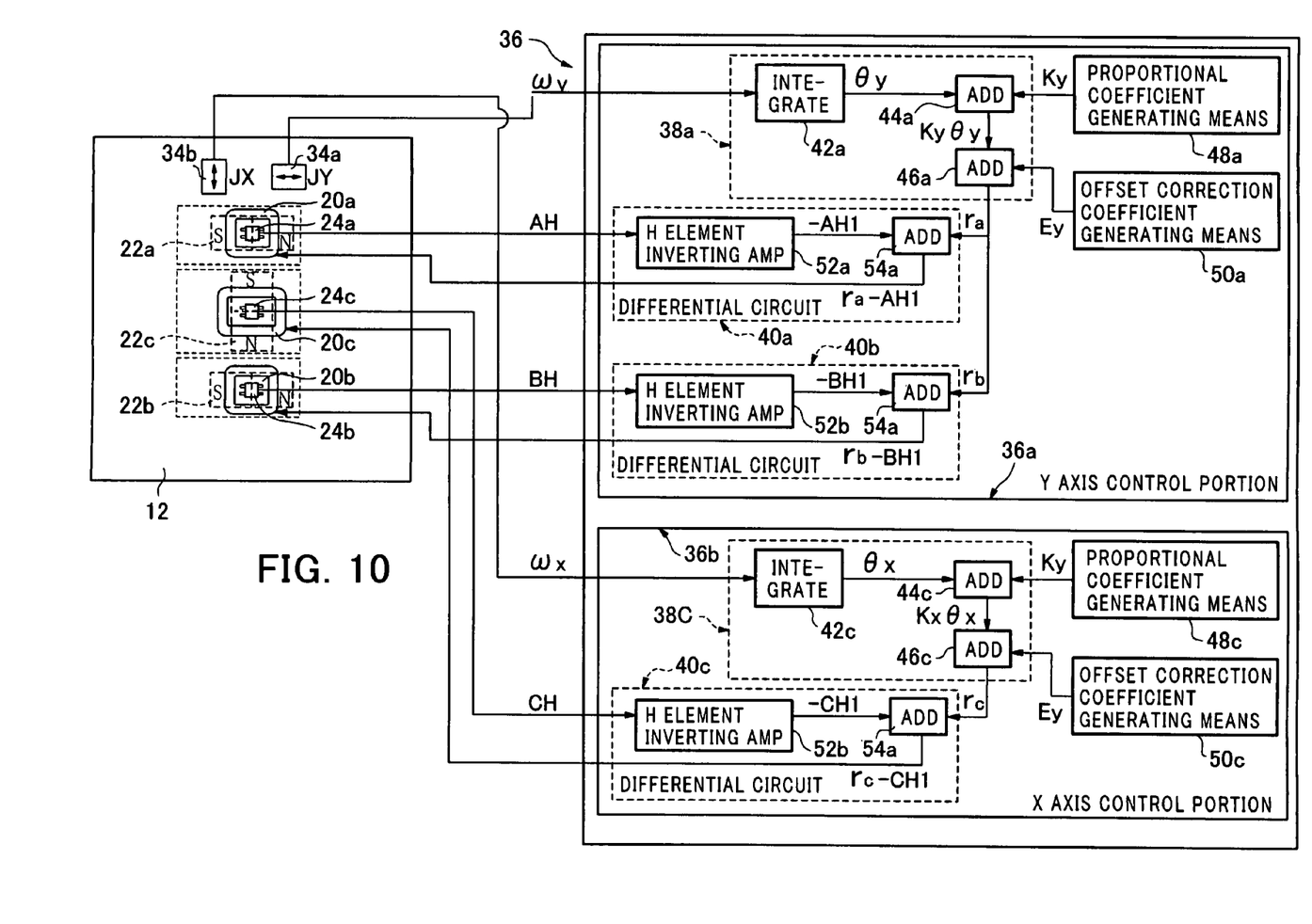
FIG. 10 A block diagram showing signal processing in a controller.

Next, referring to FIG. 10, we discuss control of the actuator 10. FIG. 10 is a block diagram showing signal processing in the controller 36. The controller 36 has an X axis control portion 36b for controlling movement in the X axis, which is the horizontal direction of the moving base 14, and a Y axis control portion 36a for controlling movement in the Y axis direction, which is the vertical direction of the moving base 14. As shown in FIG. 10, vibration of the camera main body 4 is detected from moment to moment by the two gyros 34a and 34b and input to the computing circuits 38a and 38c serving as a CCD position command signal generation means built into the controller 36. In the present embodiment the gyros 34a and 34b are constituted and disposed to respectively detect camera main body 4 pitching motion angular velocity ωy and yawing motion angular velocity ωx The computing circuits 38a and 38c are constituted to produce CCD position command signals ra, rb, and rc for commanding, on a time line, the position to which the CCD 16 is to be moved, based on continuous input of angular velocities from the gyros 34a and 34b. By continuously moving the CCD 16 based on a CCD position command signal obtained in this way, an image focused on the light receiving surface of the CCD 16 on the moving base 14 can be stabilized without distortion even if, for example, the camera main body 4 vibrates during the photographic exposure.

The CCD position command signal horizontal portion rc generated by the computing circuit 38c is input to a differential movement circuit 40c; with this circuit the current required to move the CCD 16 to a position commanded by the position command signal is sourced in a drive coil 20c. Similarly, vertical components ra and rb of the CCD position command signal generated by the computing circuit 38a are input to the differential movement circuits 40a and 40b, and current sourced to the drive coils 20a and 20b is respectively generated by these circuits.

The computing circuit 38c has an integrator circuit 42c, a multiplier circuit 44c, and an addition circuit 46c. The integrator circuit 42c performs a time integration of the yaw movement angular velocity ωx detected by the gyro 34b, calculating a yaw angle θx. The multiplier circuit 44c is constituted to multiply a certain proportional coefficient Kx, formed by a proportional coefficient generation means 48c, times the yaw angle θx calculated by the integrator circuit 42c. The addition circuit 46c is constituted to add to the output Kx θx of the multiplier circuit 44c an offset correction coefficient Ex, generated by an offset correction coefficient generating means 50c. The computing circuit 38c outputs the value Kx θx+Ex (=rc) obtained in this way to the differential motion circuit 40c.

A proportional coefficient generating means 48c generates the proportional coefficient Kx according to the distance which CCD 16 is to move in order to prevent image blurring, based on the above-described focal length of the lens unit 2. That is, the lens unit 2 zoom function causes the proportional coefficient Kx to increase when the focal length is lengthened and to decrease when the focal length is shortened. The offset correction coefficient generating means 50c generates a coefficient Ex for correcting the offset error in the gyro 34b output signal and the like. The initial position offset error (the position error at the zero point of the moving base 14 when no image blur correction is performed) in the horizontal direction of the CCD 16 (the moving base 14) is corrected by adding the coefficients generated by this offset correction coefficient generating means 50c. In addition to what is described above, the function of preventing large amplitudes in the amount of movement by the moving base 14, and the function of preventing sudden movement of the moving base 14 upon commencement or completion of blur correction, etc. can be built in by appropriately varying the coefficients generated by the proportional coefficient generating means 48c and the offset correction coefficient generating means 50c.

A Hall element inverting amplifier 52c and an addition circuit 54c are built into the differential motion circuit 40c. The Hall element inverting amplifier 52c amplifies the output signal CH of a Hall element 24c by a specified multiple and inverts its sign polarity. The addition circuit 54c adds the Hall element inverting amplifier 52c output signal −CH1 to the computing circuit 38c output signal rc and sources to the drive coil 20c an amount of current proportional to that sum. Therefore the differential motion circuit 40c outputs to the drive coil 20c a current proportional to the difference rc−CH1 between the horizontal component of the CCD position command signal and the output of the Hall element 24c; when these match, that output is zero. When a magnetic field-generating current flows in the drive coil 20c, a correspondingly disposed drive magnet 22c receives a horizontal drive force, and the moving base 14 moves in a direction approaching the horizontal position commanded by the position command signal. As a result, the moving base 14 is moved in a way which follows the CCD position command signal.

Similarly, the computing circuit 38a has an integrator circuit 42a, a multiplier circuit 44a, and an addition circuit 46a. The integrator circuit 42a time integrates a pitching motion angular velocity ωy for the pitching motion detected by the gyro 34a, calculating a pitch angle θy. The multiplier circuit 44a multiplies a specified proportional coefficient Ky generated by a proportional coefficient generating means 48a times the pitch angle calculated by the integrator circuit 42a. The addition circuit 46a adds an offset correction coefficient Ey, generated by an offset correction coefficient generating means 50a, to the output of the multiplier circuit 44a.

Except for the fact that it corrects in the vertical direction, the constitution of the proportional coefficient generating means 48a and the offset correction coefficient generating means 50a is the same as that of the proportional coefficient generating means 48c and the offset correction coefficient generating means 50c, therefore an explanation thereof is here omitted.

A Hall element inverting amplifier 52a and an addition circuit 54a are built into the differential movement circuit 40a. The differential movement circuit 40a outputs to the drive coil 20a a current ra–AH1, proportional to the difference between the vertical component ra (=rb) of the CCD position command signal output from the computing circuit 38a and the Hall element 24a output AH. Similarly, a Hall element inverting amplifier 52b and an addition circuit 54b are built into a differential circuit 40b. By this means, the differential circuit 40b outputs to the drive coil 20b a current rb–BH1 proportional to the difference between the vertical component rb of the CCD position command signal output from the computing circuit 38a and the Hall element 24b output BH. When current flows in the drive magnets 22a and 22b generating a magnetic field, the drive magnets 22a and 22b disposed corresponding thereto receive a vertical drive force, and the moving base 14 is moved in a direction approaching the vertical position commanded by the position command signal. Furthermore, because the moving base 14 receives a horizontal drive force, as described above, it moves in both the horizontal and vertical directions, following the CCD position command signal.

Figure 11:
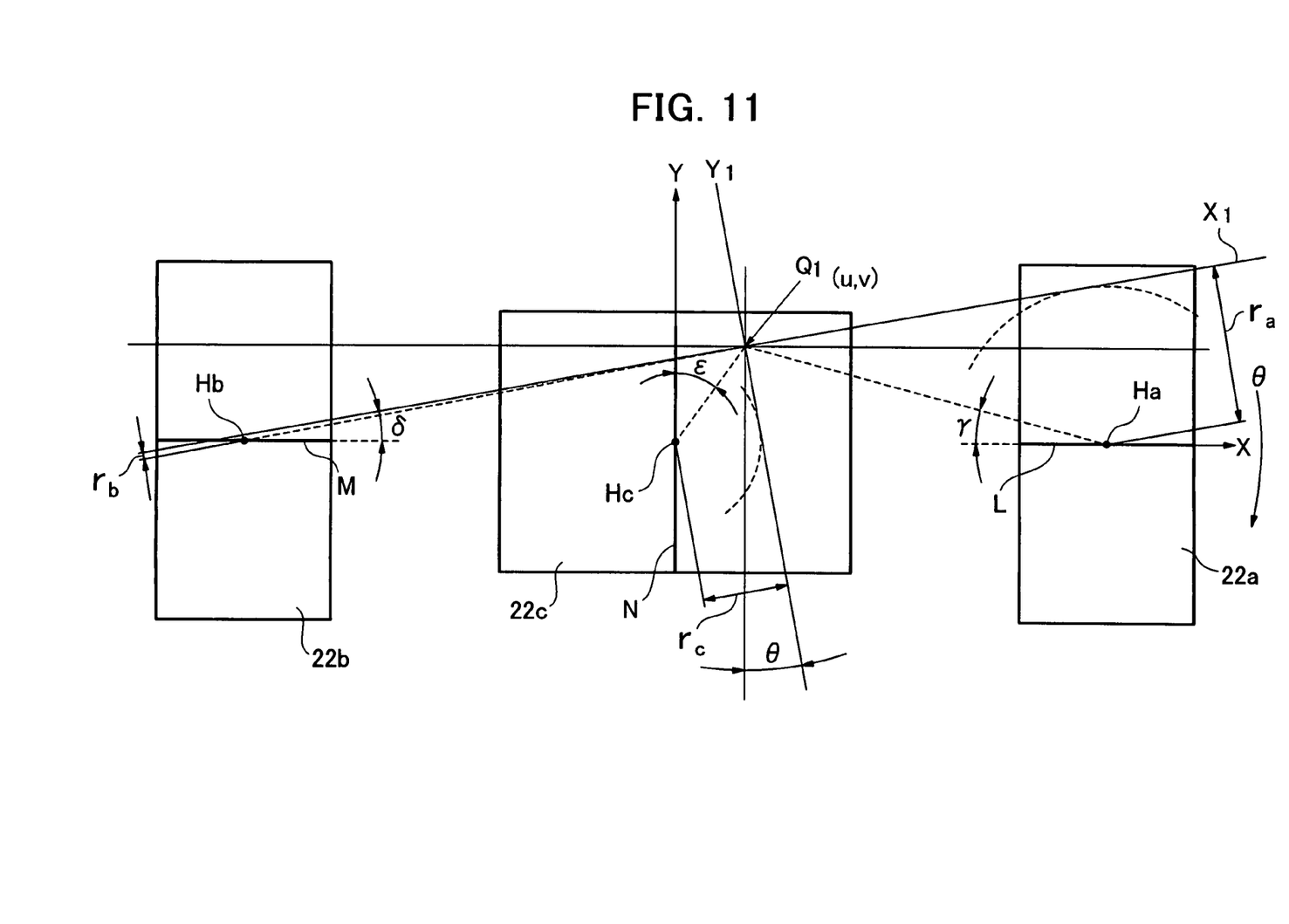
FIG. 11 A diagram showing the positional relationship between a coil disposed on a fixed plate and three drive magnets disposed on a moving base.
Figure 12:
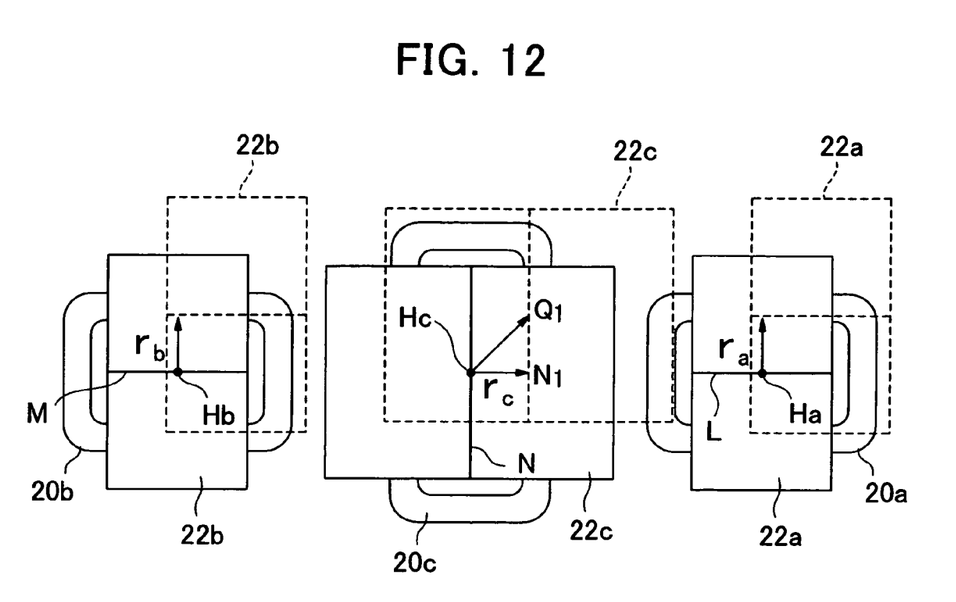
FIG. 12 A diagram showing the positional relationship between a coil disposed on a fixed plate and three drive magnets disposed on a moving base when the moving base is moved translationally.

Next, referring to FIGS. 11 and 12, we discuss command signals to bring about various movements of the moving base 14. FIG. 11 depicts the positional relationship between three drive magnets 22a, 22b, and 22c disposed on the moving base 14. First, the three drive coils 20a, 20b, and 20c are respectively disposed such that their center points Ha, Hb, and Hc align at an equal spacing on a straight line. When the moving base 14 is at the neutral position, i.e. when the center point of the CCD 16 light receiving surface is on the optical axis, the magnetically neutral axis L, M, and N of the drive magnets 22a, 22b, and 22c respectively pass through points Ha, Hb, and Hc, and the center points of each of the magnetically neutral axes is positioned to overlap the respective points Ha, Hb, and Hc. The horizontal axis passing through points Ha, Hb, and Hc is deemed to be the X axis, and the vertical axis passing through point Hc is deemed to be the Y axis. Therefore when the moving base 14 is in the neutral position, the magnetically neutral axes L and M overlap the X axis, and the magnetically neutral axis N overlaps the Y axis.

Here we shall first discuss the command signal for optional movement of the moving base 14 as desired, then we shall discuss translational movement of the moving base 14, which is mode such optional movement.

As shown in FIG. 11, when the moving base 14 moves such that the CCD 16 light receiving surface center point moves to point Q1, and the moving base 14 then further rotates counterclockwise about the point Q1 by an angle θ, the axis which includes magnetically neutral axes L and M of the drive magnets 22a and 22b moves to X1, and the axis which includes magnetically neutral axis N of the drive magnet 22c moves to Y1. Movement of the moving base 14 to such a position requires that the size of the command signal to the drive coil 20a be of a value proportional to the radius of the circle centered on point Ha, that it be tangent on axis X1, that the drive coil 20b command signal be a value proportional to the radius of the circle centered on point Hb and tangent on axis X1, and that the drive coil 20c command signal be a value proportional to the radius of the circle centered on point Hc and tangent on axis Y1. The radii of these circles shall be referred to as ra, rb, and rc.

The coordinates of point Q1 shall be (u, v), the coordinates of point Ha shall be (a, 0), and the coordinates of point Hb shall be (−a, 0). The angle formed between the straight line connecting point Q1 to point Ha and the X axis shall be γ, the angle formed between the straight line connecting point Q1 to point Hb and the X axis shall be δ, and the angle formed between the straight line connecting point Q1 to point Hc and the Y axis shall be ε.

First, the relationship in Eq. 1 obtains between the angles γ, δ, and ε the coordinates above.

$$\tan\gamma = \frac{v}{a-u}$$
$$\tan\delta = \frac{v}{-a-u}$$
$$\tan\varepsilon = \frac{u}{v}$$
Eq. 1

Assuming La is the distance between point Q1 and point Ha, Lb is the distance between point Q1 and point Hb, and Lc is the distance between point Q1 and point Hc, the following Equation 2 obtains.

$$La = \frac{v}{\sin\gamma}$$
$$Lb = \frac{v}{\sin\delta} = \frac{v}{-\sin\gamma}$$
$$Lc = \frac{u}{\sin\varepsilon}$$
Eq. 2

If ra, rb, and rc, proportional to command signals, are represented by La, Lb, and Lc, the following Equation 3 obtains.

$$r_a = La \sin(\gamma-\theta)$$
$$r_b = Lb \sin(\delta-\theta)$$
$$r_c = Lc \sin(\varepsilon-\theta)$$
Eq. 3

To summarize, substituting Equations 1 and 2 in Equation 3 we have, $$r_a = \frac{v}{\sin\gamma}(\sin\gamma\cos\theta - \cos\gamma\sin\theta) = v\cos\theta - (a-u)\sin\theta$$
$$r_b = \frac{v}{\sin\delta}(\sin\delta\cos\theta - \cos\delta\sin\theta) = v\cos\theta + (a+u)\sin\theta$$
$$r_c = \frac{u}{\sin\varepsilon}(\sin\varepsilon\cos\theta - \cos\varepsilon\sin\theta) = u\cos\theta - v\sin\theta$$
Eq. 4

Therefore if the moving base 14 is moved by an amount u in the horizontal direction and an amount v in the vertical direction, and is rotated counterclockwise by an amount θ, it is sufficient to calculate ra, rb, and rc using Eq. 4, then respectively apply to drive coils 20a, 20b, and 20c command signals corresponding to these values.

If the moving base 14 is caused to move translationally in the horizontal direction towards "u" and in the vertical direction toward v without rotation, it is sufficient to calculate ra, rb, and rc using Equation 5, by substituting 0 for θ in Equation 4.

$$r_a = v$$
$$r_b = v$$
$$r_c = u \qquad \text{Eq. 5}$$

As can be seen from Equation 5, when transitional movement alone is imparted to the moving base 14, it is sufficient to impart to drive coils 20a and 20b the same position command signals corresponding to vertical movement distance, and to impart to the drive coil 20c the position command signal corresponding to the horizontal movement distance. FIG. 12 shows the moving base 14 movement when position command signals imparting only such translational movement are applied to each of the drive coils. As shown in FIG. 12, at the neutral positions, each of the drive coils in the positions on the solid line is moved to positions on the dotted line by applying the position command signals described above. This type of position command signal corresponds to the CCD position command signal described in FIG. 10, and is generated by the controller 36 in the present embodiment.

Furthermore, when rotating the moving base 14 by an angle θ without translational movement, ra, rb, and rc can be calculated using Equation 6, by substituting 0 for u and v in Equation 4.

$$r_a = -a \sin \theta$$
$$r_b = a \sin \theta$$
$$r_c = 0 \qquad \text{Eq. 6}$$

As is clear from Equation 6, when rotational movement alone is imparted to the moving base 14, it is sufficient to apply to the drive coils 20a and 20b an oppositely signed position command signal of the same absolute value corresponding to the rotational angle, and to apply a zero position command signal to the drive coil 20c.

When controlling using the above-described controller 36, only translational movement of the moving base 14 is possible, but the actuator 10 provided on the imaging device 1 of the present embodiment of the present invention can also be constituted to move the moving base 14 as desired by changing the controller. In that case, it is sufficient for the controller to be constituted so that the coil position command signals ra, rb, and rc applied to each of the drive coils are calculated using one of Equations 4 through 6 based on the positions u, v, and θ, and for these command signals to be applied to the drive coils 20a, 20b, and 20c.

Figure 13:
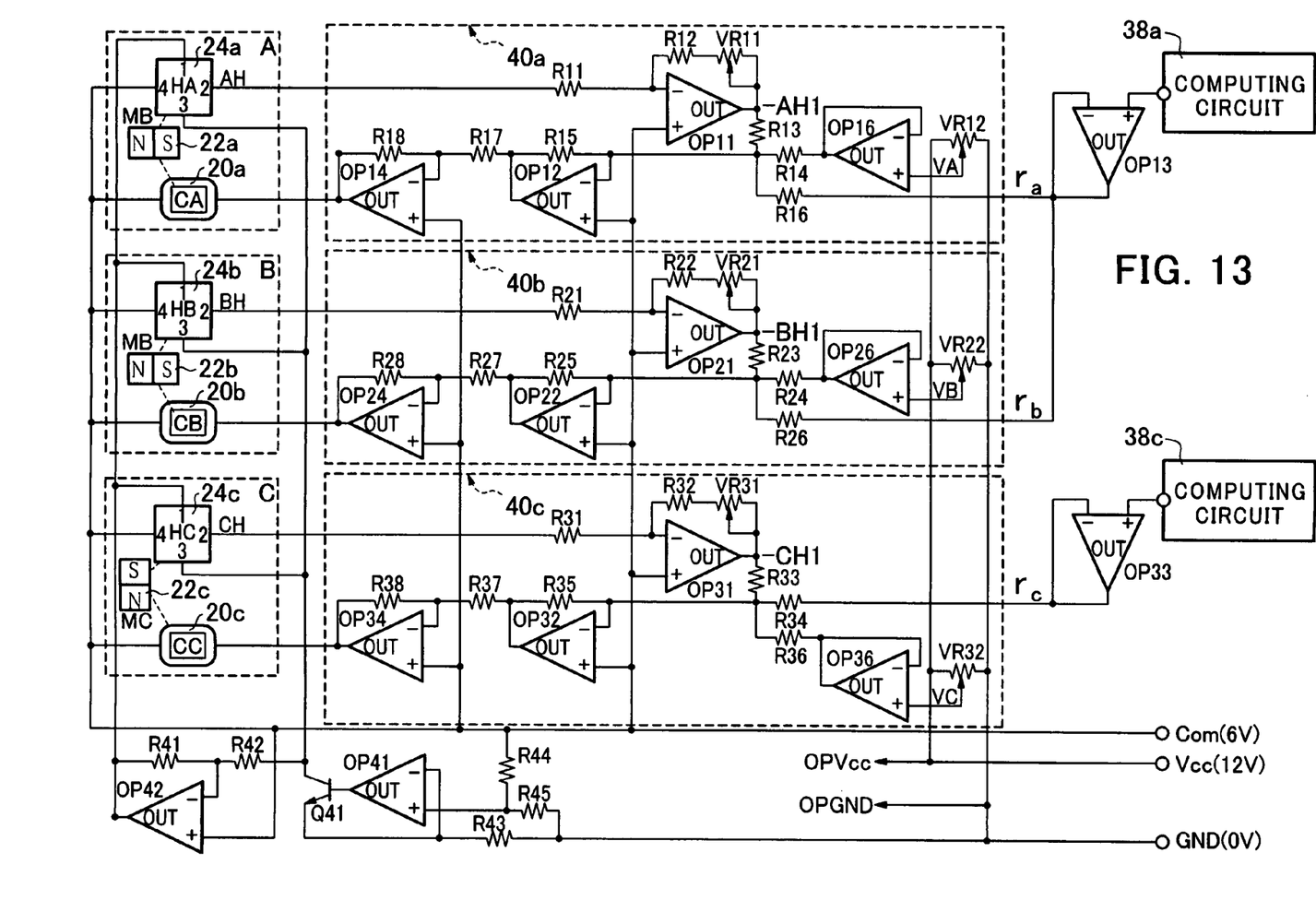
FIG. 13 A circuit diagram showing an example of a specific controller circuit.

Next, referring to FIG. 13, we discuss a specific example of a controller 36 circuit. Note that auxiliary circuits such as the power supply lines for operating each op amp are omitted in the controller 36 circuit. First, as shown in FIG. 12, power supply voltage +Vcc (12V), ground potential GND (0V), and reference voltage COM (6V) are connected to this circuit.

Terminal 4 on the Hall element 24a is connected to the reference voltage COM, and signal AH is output from terminal 2, which is an output terminal; this signal is input to the negative input terminal on the op amp OP11 via resistor R11. The negative input terminal on the op amp OP11 is connected to an output terminal on the op amp OP11 via resistor R12 and variable resistor VR11. Reference voltage COM is connected to the positive input terminal on the op amp OP11. The output terminal on the op amp OP11 is connected to the negative input terminal on op amp OP12 via a resistor R13. This op amp OP12 acts as the Hall element inverting amp 52a, and signal AH1 is output from the output terminal thereof. The gain of this Hall element inverting amplifier 52a is adjusted by the variable resistor VR11.

At the same time, the output of the computing circuit 38a is connected to the negative input terminal and the output terminal of the op amp OP13. The output terminal of the op amp OP13 is connected to the negative input terminal of the op amp OP12 via a resistor R16. This op amp OP13 acts as an output buffer amp for computing circuit 38a, and the signal ra is output from that output terminal. The output of the Hall element inverting amplifier 52a and the output of the computing circuit 38a are added at the negative input terminal of the op amp OP12. Therefore the op amp OP12 functions as an addition circuit 54a.

The power supply voltage +Vcc and ground potential GND are voltage divided by the variable resistor VR12, and the divided potential VA is connected to the positive input terminal of op amp OP16. The negative input terminal of the op amp OP16 is connected to the output terminal of the op amp OP16, and the output terminal of the op amp OP16 is connected to the negative input terminal of the op amp OP12 via resistor R14. This op amp OP16 is used as a buffer amp for the potential VA, which is voltage divided by the variable resistor VR12.

At the same time, the positive input terminal of the op amp OP12 is connected to the reference voltage COM. The negative input terminal of the op amp OP12 is connected to the output terminal of the op amp OP12 via the resistor R15. By this means, the op amp OP12 functions as an inverting amplifier. Therefore the value output from the output terminal of the op amp OP12 is the inverted sign value of the added outputs of the computing circuit 38a and the Hall element inverting amplifier 52a. I.e., a voltage −R15 (−HA1/R13+ra/R14+VA/R16) is output from the output terminal of the op amp OP12.

The output terminal of the op amp OP12 is connected to the negative input terminal of the op amp OP14 via the resistor R17. The negative input terminal of the op amp OP14 is connected to the output terminal of the op amp OP14 via the resistor R18. Furthermore, the positive input terminal of the op amp OP14 is connected to the reference voltage COM. The op amp OP14 thus acts as an inverting amplifier; the sign inverted by the op amp OP12 is returned to its original sign and output from the op amp OP14. An offset voltage appearing on the output terminal of the op amp OP14 is corrected by adjusting the variable resistor VR12. Note that in the present embodiment a gain of approximately 200 is obtained using this inverting amplifier.

The output terminal of the op amp OP14 is connected to one terminal on the drive coil 20a, and the other terminal of the drive coil 20a is connected to the reference voltage COM. In this way, when the output voltage from the op amp OP14 exceeds the op amp OP14, a current flows from the op amp OP14 to the drive coil 20a in the direction of the reference voltage COM, and when the output voltage of the op amp OP14 drops below the reference voltage COM, a current flows in the opposite direction.

At the same time, op amps OP41 and OP42, transistor Q41, and resistors R41 through R45 form a fixed current circuit for supplying current to each of the Hall devices for operating those Hall devices. In the present embodiment, a current of approximately 3 mA is caused to flow between terminals 1 and 3 on each of the Hall devices 24a, 24b, and 24c.

We have described above the structure of the differential movement circuit 40a; because the differential circuits 40b and 40c have a similar structure, an explanation thereof is here omitted. Note that the differential movement circuit 40a op amps OP11, OP12, OP14, and OP16 respectively serve the same functions as differential circuit 40b op amps OP21, OP22, OP24, and OP26, and differential motion circuit 40c op amps OP31, OP32, OP34, and OP36. Numbering is similarly assigned to electrical resistors and variable resistors.

As described above, the moving base is controlled by proportional control alone in the present embodiment, but appropriate combinations of integral and differential control may also be implemented.

Next, referring to FIGS. 1 through 10, we explain the operation of an imaging device 1 according to the present embodiment of the present invention. First, an actuator 10 provided on the camera main body 4 is activated by turning on a start switch (not shown) for the image blur correction function on the imaging device 1. The gyros 34a and 34b attached to a fixed plate 12 continuously detect vibration in a specified frequency band, outputting values to computing circuits 38a and 38b built into the controller 36. The gyro 34a outputs a signal for camera main body 4 angular velocity in the pitch direction to the computing circuit 38a, while the gyro 34b outputs a signal for angular velocity in the yaw direction to the computing circuit 38b. The computing circuit 38a integrates the input angular velocity signal over time, calculating a pitching angle.

The calculated angle is corrected based on the output signals from the proportional coefficient generating means 48a and the offset correction coefficient generating means 50a, generating CCD position command signal vertical direction components ra and rb (ra and rb are the same signal). The proportional coefficient generating means 48a detects the position of the lens unit 2 zoom adjustment ring (not shown), determining a proportional constant based on this position.

Similarly, the computing circuit 38c integrates the input angular velocity signal over time, calculates a yaw angle, and adds to this a specified correction to produce the horizontal component rc of the CCD position command signal. Continuous movement of the CCD 16 to the position commanded by the CCD position command signal output over time by the computing circuits 38a and 38b results in stabilization of the image formed on the CCD 16 light receiving surface.

The vertical components ra and rb of the CCD position command signal generated by the computing circuit 38a are respectively input to the differential movement circuits 40a and 40b. The horizontal component rc of the CCD position command signal generated by the computing circuit 38c is input to the differential motion circuit 40c.

At the same time, the Hall element 24a disposed inside the drive coil 20a outputs a detection signal to the differential movement circuit 40a, as does the Hall element 24b inside the drive coil 20b to the differential circuit 40b, and the Hall element 24c inside the drive coil 20c to the differential motion circuit 40c.

The differential movement circuits 40a, 40b, and 40c respectively generate voltages in response to the difference between each of the input Hall element detection signals and the CCD position command signals ra, rb, and rc, sourcing currents proportional to these voltages to the drive coils 20a, 20b, and 20c. The flow of current to each of the drive coils generates a magnetic field proportional to that current. This magnetic field results in each of the drive magnets 22a, 22b, and 22c disposed to correspond to these drive coils 20a, 20b, and 20c receiving a drive force approaching the direction of the positions designated by the CCD position command signals ra, rb, and rc, such that the moving base 14 is moved. When each drive magnet reaches the position designated by the CCD position command signal under this drive force, the output of the differential circuits goes to 0, since the CCD position command signal and the Hall element detection signal match, and the drive force also goes to 0. If the drive magnets drift from the position designated by the CCD position command signal due to external disturbances or changes in the CCD position command signal or the like, a current again flows in each of the drive coils, and the drive magnets are returned to the positions designated by the coil position command signals.

By continuous repetition of the process above, the CCD 16 attached to the moving base 14 provided with drive magnets is moved in response to the lens position command signal. This results in stabilization of the image focused on the CCD 16 light receiving surface.

In an imaging device according to a present embodiment of the present invention, a moving base to which an imaging element is attached is supported by steel balls so as to be movable in any desired direction within a plane parallel to the light receiving surface of the imaging element, therefore the imaging element can be moved with good precision without accumulation of looseness in the support means, as occurs in conventional support mechanisms in which a movable portion is movably supported by combining movement along two perpendicular axes.

Also, because in the imaging device of the present embodiment the moving base 14 is moved by the rolling of steel balls, there is no significant sliding resistance associated with the movement of the moving base, and the moving base can be moved with a small drive force.

Furthermore, in the imaging device of the present embodiment, the two magnets at the two ends among the three drive magnets receive a drive force in the vertical direction, and the middle drive magnet is disposed to receive a horizontal drive force, therefore the drive forces in each direction can be independently determined, and calculations in the controller can be simplified.

In the imaging device of the present embodiment, the proportional coefficient generating means varies the degree of CCD movement based on the lens unit focal length, therefore even if focal length or the like is changed due to the zoom mechanism, etc., blurring of the image on the CCD can be effectively suppressed.

In the imaging device according to the present embodiment of the present invention, drive magnet magnetism is detected by the Hall element to measure the position of the moving base, therefore the drive magnet can serve double duty without the need for providing a separate Hall element magnet. Also, because the Hall element is disposed inside the drive coil, the point on which the force exerted from the drive coils acts on the drive magnets is essentially equal to the point at which position is measured by the Hall elements on the drive magnets, so that the position of the moving base can be accurately detected without being affected by mechanical play or the like.

Above we have discussed a preferred embodiment of the present invention, but various changes could also be made to the above-described embodiments. In particular, in the above-described embodiment we discussed the case in which the image blur correction device of the present invention is built into a still image capture imaging device, but the image blur correction device of the present invention could also be used in a stand-alone form, or built into a moving picture imaging device. In the above-described embodiment the drive magnets are attached to the moving base, and drive coils are attached to a fixed plate, but these could also be reversed. Furthermore, in the above-described embodiment a single drive magnet is disposed corresponding to a single drive coil, but a set of drive magnets comprising two or more drive magnets could be disposed in lieu of a single drive magnet and caused to operate in the same way as the above-described embodiment. Note that in this Specification, such a set of drive magnets acting in this manner is also included in the phrase "(1) drive magnet." Also, in the above-described embodiment the moving base is supported by steel balls, but the moving base can also be supported by a sliding means in which the moving base and the fixed base are slid directly on a flat, smooth surface.

EXPLANATION OF REFERENCE NUMERALS 1 imaging device
2 lens unit
4 camera main body
6 lens barrel
8 imaging lens
10 actuator
12 fixed plate
12a flexible cable
14 moving base
16 CCD
18 steel balls
20a, 20b, 22c drive coils
22a, 22b, 22c drive magnets
24a, 24b, 24c Hall elements
26 pull-in yoke
28 back yoke
30 pull-in magnets
32 steel ball holders
34a, 34b gyros
36 controller
38a, 38c computing circuits
40a, 40b, 40c differential movement circuits
42a, 42c integrator circuits
44a, 44c multiplier circuits
48a, 48c proportional coefficient generating means
50a, 50c offset correction coefficient generating means
52a, 52b, 52c Hall element inverting amplifiers
54a, 54b, 54c addition circuits

The invention claimed is:

1. An image blur correction device comprising:
a fixed member;
a movable member to which an imaging element is affixed;
support means supporting the movable member relative to the fixed member such that the movable member can move translationally and rotationally within a plane parallel to the light receiving surface of the imaging element;
at least three drive coils disposed on either the fixed member or the movable member;
at least three position sensors disposed on the member among the fixed member and the movable member to which the drive coils are attached;
at least three drive magnets respectively attached to the other of the fixed member or movable member at positions opposing each of the drive coils, so as to receive a drive force from the magnetic field generated by each of the drive coils;
detection means for detecting blurring of an optical axis of light incident on the light receiving surface of the imaging element; and
a control means for controlling the blurring of an image formed on the imaging element by sourcing current to each drive coil to move the movable member such that it is moved translationally, without rotational movement, in the X and Y directions, based on the optical axis blurring detected by the detection means, and based on the detected position of the movable member relative to the fixed member as detected by the position sensor;
wherein three of the drive coils are disposed on an approximately straight line, and two of the drive magnets opposed thereto are disposed to receive a drive force in a direction of a first axis by a magnetic field generated by the drive coils, while the other drive magnet is disposed to receive a drive force in a direction of a second axis approximately perpendicular to the first axis by a magnetic field generated by the drive coil opposed thereto.

2. The image blur correction device according to claim 1, wherein the control means comprises an X axis control portion for controlling X direction movement, and a Y axis control portion for controlling Y direction movement.

3. The image blur correction device according to claim 1, wherein the control means independently controls the current sourced to each of the drive coils.

4. The image blur compensation device according to claim 1, further comprising a pull-in yoke for pulling in the movable member and the fixed member attached to whichever of the above fixed member and movable member to which the drive magnet is not attached, wherein the support means comprises at least three spherical bodies sandwiched between the fixed member and the movable member.

5. The image blur correction device according to claim 1, wherein at least one of the drive magnets is disposed to receive a drive force in a direction of a first axis by a magnetic field generated by the drive coil opposed thereto, and the other drive magnet is disposed to receive a drive force in a direction different from the first axis, by magnetic fields generated by each of the drive coils opposed thereto.

6. The image blur correction device according to claim 1, wherein at least three of the position sensors are respectively constituted to measure the positions of corresponding drive magnets, the outputs of the position sensors disposed to correspond respectively to the two drive magnets receiving a drive force in the direction of the first axis are respectively input to differential circuits built into the control means, and these differential circuits generate current sourced to each of the drive coils respectively disposed opposite the two drive magnets receiving a drive force in the direction of the first axis.

7. The image blur correction device according to claim 1, wherein the control means corrects the current sourced to each of the drive coils based on information about the imaging lens focal length for forming an image on the imaging element, or based on an initial imaging device offset value.

8. An image blur correction device comprising:
a movable member having an imaging element mounted on one side thereof, and at least three drive magnets arrayed in a row and mounted on the other side thereof;
a fixed member having at least three drive coils respectively mounted at positions corresponding to the drive magnets on one of the sides opposing the other side of the movable member, and position detection means disposed within said drive coils;

a sliding means interposed between the movable member and the fixed member, capable of sliding when the movable member moves;

an angular velocity detection means for obtaining a vehicle detection value by detecting the angular velocity component of the inclination of an optical axis due to blur;

actuators having the drive coils, the position detection means, and the drive magnets, at least three said actuators being arrayed in a row, obtaining a specified position signal in response to the strength of the magnetic field from said position detection means, and being supplied with a specified drive correction signal, said actuator causing movement to a specified corrected position to correct for blurring of the movable member, using at least the propulsion created by the interaction of the drive coils and the drive magnets;

a control means for obtaining a corrected position command signal based on the angular velocity detection value and the specified correction signal, and for supplying drive correction signals for correcting blur to the actuator from said position command signals and from the position signals; and whereby using the control means, the actuator is capable of moving the movable member in the two directions X and Y.

9. The image blur correction device according to claim 8, wherein three drive magnets are disposed, and of the drive magnets, the two at each end receive a vertical drive force, and the center drive magnet is disposed to receive drive force in a horizontal direction.

10. An imaging device comprising:
    the image blur correction device according to claim 1; and
    a lens unit provided with an imaging lens for forming an image on the imaging element attached to the movable member of the image blur correction device.

11. An imaging device comprising:
    the image blur correction device according to claim 8; and
    a lens unit provided with an imaging lens for forming an image on the imaging element attached to the movable member of the image blur correction device.

* * * * *